US006529498B1

United States Patent
Cheng (10) Patent No.: US 6,529,498 B1
(45) Date of Patent: *Mar. 4, 2003

(54) ROUTING SUPPORT FOR POINT-TO-MULTIPOINT CONNECTIONS

(75) Inventor: Dean Cheng, Fremont, CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/172,109

(22) Filed: Oct. 13, 1998

Related U.S. Application Data (63) Continuation-in-part of application No. 09/107,038, filed on Jun. 29, 1998, and a continuation-in-part of application No. 09/069,069, filed on Apr. 28, 1998.

(51) Int. Cl.[7] .............................................. H04L 12/28

(52) U.S. Cl. ..................................... 370/351; 370/395.3

(58) Field of Search .................................. 370/395, 230, 370/235, 237, 238, 248, 252, 256, 351, 384, 395.1, 395.2, 395.21, 395.3, 395.31, 395.32, 432

(56) References Cited

U.S. PATENT DOCUMENTS

| | | | |
|---|---|---|---|
| 4,466,060 A | | 8/1984 | Riddle |
| 4,905,233 A | | 2/1990 | Cain et al. |
| 5,115,495 A | | 5/1992 | Tsuchiya et al. |
| 5,253,248 A | | 10/1993 | Dravida et al. |
| 5,274,643 A | | 12/1993 | Fisk |
| 5,313,454 A | | 5/1994 | Bustini |
| 5,317,562 A | | 5/1994 | Nardin et al. |
| 5,844,887 A | | 12/1998 | Oren et al. |
| 5,903,559 A | | 5/1999 | Acharya et al. |
| 5,948,069 A | * | 9/1999 | Kitai et al. .................. 709/240 |
| 5,991,272 A | * | 11/1999 | Key et al. ..................... 370/252 |
| 5,991,295 A | | 11/1999 | Tout et al. |
| 5,995,503 A | | 11/1999 | Crawley et al. |
| 6,026,077 A | | 2/2000 | Iwata |
| 6,041,059 A | | 3/2000 | Joffe et al. |
| 6,067,298 A | * | 5/2000 | Shinohara .................... 370/395 |
| 6,094,687 A | * | 7/2000 | Drake, Jr. et al. .......... 709/241 |
| 6,097,722 A | * | 8/2000 | Graham et al. ............. 370/395 |

(List continued on next page.)

OTHER PUBLICATIONS

Stallings, ISDN and Broadband ISDN with Frame Realy and ATM, 1989, p. 463.*

Alles, ATM Internetworking, May 1995, pp. 1–22.*

(List continued on next page.)

*Primary Examiner*—David Vincent
(74) *Attorney, Agent, or Firm*—Blakely, Sokoloff, Taylor & Zafman LLP (57) ABSTRACT

A distrubution tree for point-to-multipoint connections within a computer network may be dynamically created according to the number of connections shared by individual point-to-point connections which comprise the point-to-multipoint connection. Each distribution tree represents a collection of DTLs, overlapped from a root node of the tree to leaf nodes thereof. The distribution tree may be organized as a distribution table having two dimensions with row indices thereof comprising PNNI node indices of succeeding nodes along a connection DTL. Individual entries in a first column of the distribution table may indicate PNNI node indices of proceeding nodes along the connection DTL. Individual entries in a second column of the distribution table may indicate the number of point-to-point connections for the point-to-multipoint connection that use a link connecting a pair of proceeding and succeeding nodes. A path (or sub-path) may be selected from the distribution table in response to a request for a point-to-multipoint connection within the ATM network. Further, the distribution table may be updated in response to a call being added or dropped within the network.

31 Claims, 6 Drawing Sheets

U.S. PATENT DOCUMENTS

| | | | |
|---|---|---|---|
| 6,104,701 A | | 8/2000 | Avargues et al. |
| 6,122,272 A | | 9/2000 | Tomaszewski et al. |
| 6,141,325 A | | 10/2000 | Gerstel |
| 6,144,661 A | * | 11/2000 | Katsube et al. ............. 370/390 |
| 6,201,810 B1 | | 3/2001 | Masuda et al. |
| 6,202,082 B1 | | 3/2001 | Tomizawa et al. |
| 6,256,309 B1 | * | 7/2001 | Daley et al. ................ 370/395 |
| 6,304,549 B1 | | 10/2001 | Srinivasan et al. |

OTHER PUBLICATIONS

The ATM Forum Technical Committee, "Private–Network–Network Interface Specification Version 1.0 (PNNI 1.0)," ATM Forum document No. af–pnni–0055.000, Mar. 1996.

Radia Perlman, "Interconnections: Bridges and Routers," Addison–Wesley, pp. 230–231, 1992.

Sedgewick, R., "Algorithms in C++," Addison–Wesley, pp. 454–458, 1992.

Turner, J.S., "New Directions in Communications (or Which Way to the Information Age?)," IEEE Communications Magazine, vol. 24, No. 10, Oct. 1995.

Dickie, M., "Routing in Today's Internetworks," Van Nostrand Rheinhold, pp. 73–74, 1994.

Moy, J., "Multicast Extensions to OSPF," Network Working Group, RFC 1584, Mar. 1994.

The ATM Forum, "ATM User–Network Interface Specification Version 3.1," Sep. 1994.

R. Callon, R. Coltun, J. Drake, J. Feffords, G. Swallow, "A Strawman Proposal for the ATM PNNI Routing Hierarchy," ATM Forum 94–0073, Jan. 1994.

K. Sivarajan, W. Lee, "Issues in the Aggregation of Link State Parameters in Hierarchical PNNI Networks," ATM Forum 94–0646, Jul. 18–24, 1994.

Whay Lee, "A Minimal Spanning Connectivity Method for Link State Aggregation," ATM Forum 94–0673. Jul. 1994.

Ethan A. Spiegel, "Representation of Node Parameters Using Exceptions," ATM Forum 94–0907, Sep. 26–29, 1994.

Stevens, Richard, W., "TCP/IP Illustrated," Addison Wesley, vol. 1, pp. 127–141 (1994).

Lee, Whay C., Hluchyi, Michael G., and Humblet, Pierre A., "Routing Subject to Quality of Service Constraints in Integrated Communication Networks," IEEE Network, pp. 46–55, (Jul./Aug. 1995).

ATM Forum 94–0471R12, Appendix H: Route Generation Algorithm, pp. 256–263 (prior to Feb. 1996).

ATM–Forum_95–0099,"A Sample Algorithm for Route Generation," ATM Forum Technical Committee PNNI Subworking Group, pp. 1–7 (Jan. 26, 1995).

"Traffic Management Specification v4.0," The ATM Forum Technical Committee (Apr. 1996).

"Addendum to Traffic Management v4.0 for ABR Parameter Negotiation," The ATM Forum Technical Committee (Jan. 1997).

The ATM Forum Technical Committee, "Integrated Local Management Interface (ILMI) Specification, Version 4.0," ATM Forum document No. af–ilmi–0065.000, Sep. 1996.

The ATM Forum Technical Committee, "ATM User–Network Interface (UNI) Signalling Specification, Version 4.0," ATM Forum document No. af–sig–0061.000, Jul. 1996.

"Addendum to UNI Signalling v4.0 for ABR Parameter Negotiation," The ATM Forum Technical Committee (Jan. 1997).

The ATM Forum, "ATM User–Network Interface, Version 3.1 (UNI 3.1) Specification," Draft of May 28, 1994.

The ATM Forum Technical Committee, "Private–Network–Network Interface Specification Version 1.0 Addendum (Soft PVC MIB)," ATM Forum document No. af–pnni–0066.000, Sep. 1996.

Whay C. Lee, "Some Guidelines for P–NNI Topology Aggregation," ATM Forum 95–0153, Feb. 1995.

Rauf Izmailov et al., "Aggregation of Administrative Weight," ATM Forum 96–0818, Jun. 1995.

The ATM Forum, "ATM Forum 94–0471R16: PNNI Draft Specification (PNNI SWG)," Feb. 1996.

Khalid Ahmad and Todd Morris, "Clarification on use of VPC and Bandwidth Handling for the B–ICI," ATM Forum 94–0676, Jul. 18, 1994.

George C. Sackett and Christopher Y Metz, ATM and Multiprotocol Networking, McGraw–Hill, Chapter 10, pp. 215–228, 1997.

Uyless Black, "ATM Foundation for Broadband Networks," Prentice Hall PTR, pp. 141–142, 208–214, 223–229, 241, 248–249, 1995.

Anthony Alles, "ATM Networking", pp. 1–58, (5/95).

Whay C. Lee, Michael G. Hluchyi and Pierre A. Humblet, "Routing Subject to Quality of Service Constraints in Integrated Communication Networks", IEEE Network, pp. 46–55 (Jul./Aug. 1995).

ATM–Forum 94–0471R12, Appendix H: Route Generation Algorithm, pp. 256–263.

ATM–Forum_95–0099, "A Sample Algorithm for Route Generation", ATM Forum Technical Committee PNNI Subworking Group, pp. 1–7 (Jan. 26, 1995).

Stevens, Richard, W., TCP/IP Illustrated, vol. 1, 1994, Addison Wesley, pp. 127–141.

Sacket et al., ATM and Multiprotocol Networking, 1997, pp. 215–228.

* cited by examiner

TABLE 1

|   | 1 | 2 | 3 | 4 | 5 | 6 | 7 | 8 | 9 |
|---|---|---|---|---|---|---|---|---|---|
| 1 | 0 | 0 | 0 | 0 | 0 | 0 | 0 | 0 | 0 |
| 2 | 0 | 0 | 0 | 0 | 0 | 0 | 0 | 0 | 0 |
| 3 | 0 | 0 | 0 | 0 | 0 | 0 | 0 | 0 | 0 |
| 4 | 0 | 0 | 0 | 0 | 0 | 0 | 0 | 0 | 0 |
| 5 | 0 | 0 | 0 | 0 | 0 | 0 | 0 | 0 | 0 |
| 6 | 0 | 0 | 0 | 0 | 0 | 0 | 0 | 0 | 0 |
| 7 | 0 | 0 | 0 | 0 | 0 | 0 | 0 | 0 | 0 |
| 8 | 0 | 0 | 0 | 0 | 0 | 0 | 0 | 0 | 0 |
| 9 | 0 | 0 | 0 | 0 | 0 | 0 | 0 | 0 | 0 |

TABLE 2

|   | 1 | 2 | 3 | 4 | 5 | 6 | 7 | 8 | 9 |
|---|---|---|---|---|---|---|---|---|---|
| 1 | 0 | 0 | 0 | 0 | 0 | 0 | 0 | 0 | 0 |
| 2 | 1 | 0 | 0 | 0 | 0 | 0 | 0 | 0 | 0 |
| 3 | 0 | 1 | 0 | 0 | 0 | 0 | 0 | 0 | 0 |
| 4 | 0 | 0 | 0 | 0 | 0 | 0 | 0 | 0 | 0 |
| 5 | 0 | 0 | 0 | 0 | 0 | 0 | 0 | 0 | 0 |
| 6 | 0 | 0 | 1 | 0 | 0 | 0 | 0 | 0 | 0 |
| 7 | 0 | 0 | 0 | 0 | 0 | 1 | 0 | 0 | 0 |
| 8 | 0 | 0 | 0 | 0 | 0 | 0 | 0 | 0 | 0 |
| 9 | 0 | 0 | 0 | 0 | 0 | 0 | 0 | 0 | 0 |

TABLE 3

|   | 1 | 2 | 3 | 4 | 5 | 6 | 7 | 8 | 9 |
|---|---|---|---|---|---|---|---|---|---|
| 1 | 0 | 0 | 0 | 0 | 0 | 0 | 0 | 0 | 0 |
| 2 | 2 | 0 | 0 | 0 | 0 | 0 | 0 | 0 | 0 |
| 3 | 0 | 2 | 0 | 0 | 0 | 0 | 0 | 0 | 0 |
| 4 | 0 | 0 | 0 | 0 | 0 | 0 | 0 | 0 | 0 |
| 5 | 0 | 0 | 0 | 0 | 0 | 0 | 0 | 0 | 0 |
| 6 | 0 | 0 | 2 | 0 | 0 | 0 | 0 | 0 | 0 |
| 7 | 0 | 0 | 0 | 0 | 0 | 1 | 0 | 0 | 0 |
| 8 | 0 | 0 | 0 | 0 | 0 | 1 | 0 | 0 | 0 |
| 9 | 0 | 0 | 0 | 0 | 0 | 0 | 0 | 0 | 0 |

TABLE 4

|   | 1 | 2 | 3 | 4 | 5 | 6 | 7 | 8 | 9 |
|---|---|---|---|---|---|---|---|---|---|
| 1 | 0 | 0 | 0 | 0 | 0 | 0 | 0 | 0 | 0 |
| 2 | 3 | 0 | 0 | 0 | 0 | 0 | 0 | 0 | 0 |
| 3 | 0 | 3 | 0 | 0 | 0 | 0 | 0 | 0 | 0 |
| 4 | 0 | 0 | 0 | 0 | 0 | 0 | 0 | 0 | 0 |
| 5 | 0 | 0 | 1 | 0 | 0 | 0 | 0 | 0 | 0 |
| 6 | 0 | 0 | 2 | 0 | 0 | 0 | 0 | 0 | 0 |
| 7 | 0 | 0 | 0 | 0 | 0 | 1 | 0 | 0 | 0 |
| 8 | 0 | 0 | 0 | 0 | 0 | 1 | 0 | 0 | 0 |
| 9 | 0 | 0 | 0 | 0 | 1 | 0 | 0 | 0 | 0 |

ROUTING SUPPORT FOR POINT-TO-MULTIPOINT CONNECTIONS

RELATED APPLICATIONS

The present application is a continuation-in-part of application Ser. No. 09/107,038, entitled "Dynamically Created Service Class-Based Routing Tables", filed Jun. 29, 1998, by Dean Cheng and is also a continuation in part of application Ser. No. 09/069,069, entitled "Routing Table Structures", filed Apr. 28, 1998, by Dean Cheng.

FIELD OF THE INVENTION

The present invention is related to the creation of structures used for computer network routing tables and, in particular, for PNNI routing tables used for point-to-multipoint connections in ATM networks.

BACKGROUND

Asynchronous Transfer Mode (ATM) is a connection-oriented system. As such, connection requests need to be routed from a requesting node though the ATM network to a destination node. The ATM Forum has defined a private network-to-network or node-to-node interface (PNNM) protocol that allows easier interconnection of ATM switches. The PNNI protocol consists of two components. The first is a signaling protocol used to relay ATM connection requests within a network between a source and a destination. The second is a routing protocol used to determine the path for routing signaling requests though the ATM network. The goal of the PNNI protocol is to advertise enough information between the nodes of a network so as to allow the nodes to route call requests within the network. Ideally, every ATM switch in a network would not only know the address of every ATM attached installation but also the current available composite (VPI/VCI) for new switched virtual circuits (SVCs) to every switch. However, as ATM networks grow to include hundreds or even thousands of switches supporting tens of thousands of users and devices, such an implementation becomes unfeasible.

Nevertheless, finding the shortest or best available path from one point to another across an ATM network does require that each node know something about what the network looks like. For example, each node must know its own whereabouts in the network and be able to locate other nodes or ATM installations so that it can establish virtual circuits offering the appropriate speed and quality of service (QoS) parameters. The solution devised by the ATM Forum is a scheme that distributes and summarizes network topologies so that nodes have detailed information about their local topology and summarized information about more distant regions of the network. The PNNI protocol manages this information through the use of a hierarchical topology, along with an addressing scheme similar to that used in telephony networks.

For each node (e.g., switch) of an ATM network, a PNNI interface associates a connection between two nodes and the connection may be a physical link or a virtual path connection (VPC). In general, every PNNI-capable node has several such interfaces and each is associated with a set of parameters (usually stored in a data structure in memory), including a traffic metrics table that stores the available traffic resource parameters on the link associated with the interface (in the forward direction). These traffic metrics tables are generally two-dimensional and associate service classes with the type of traffic metrics or attributes supported by the connection. In one sense, PNNI is a link state algorithm and QoS-based routing protocol which can collect and advertise these link state parameters (i.e., the attributes and metrics that are associated with each link and node) which become the bases for routing path selections within the network.

Using PNNI, network nodes are provided with "reachability information" (i.e., based on the traffic metrics and attributes) about other nodes. This reachability information is used by a source node to construct a designated transit list (DTL) that describes a complete route to a destination node. The DTL is inserted into a signaling request, which is then transmitted along the path described by the DTL. Thus, using PNNI, a single connection will be set up between the source node and the destination node.

ATM nodes configured to use the PNNI routing protocol advertise the reachability of a particular ATM address over multiple ATM physical links. The various levels of the switching hierarchy established by PNNI, map different segments of the overall ATM network in different degrees of detail. By breaking a large network of ATM switches into smaller domains called peer groups, PNNI allows individual switches to navigate paths through the entire network without requiring them to store an entire map of the network in memory. PNNI organizes nodes into peer groups and nodes within a peer group elect a leader node called a peer group leader. The peer group leader summarizes information about the peer group and presents that information to the next higher level hierarchy and also instantiates a logical group node (LGN) at the next higher level. The LGN represents its own child peer group at the lower level and becomes the peer of other LGNs at its level.

Using PNNI then, nodes in an ATM network automatically form a hierarchy of peer groups according to addresses assigned by a network manager. The nodes' ATM addresses provide the key to the structure of this hierarchy. Each peer group has its own identifier (called a peer group ID), similar to a telephone exchange or area code. For a lower level peer group this ID is similar to an area code and exchange. For a higher peer group, it would be similar to just the area code. Finally, each node within a peer group has a unique address; similar to the way each line in a telephone exchange has a unique number.

Once the PNNI hierarchy is created, peer group leaders are allocated, and routing information is exchanged. Thereafter, the ATM nodes can begin to establish SVCs between various end-stations on the network. Using the PNNI protocol, installations on remote networks can easily establish SVCs across the hierarchy with other end stations and different peer groups.

When a signaling request is received across a user-to-network interface (UNI) by an ingress node, the node will use a shortest path algorithm, such as a Dijkstra calculation, to determine a path to connect the call to the desired destination. This calculation will create a set of DTLs, and each node will have: a full, detailed path within the source node's own peer group; a less detailed path within the parent peer groups; and even less detail on higher level peer groups, terminating in the lowest level peer group which is an ancestor of both the source and the destination nodes. Hence, using PNNI, SVCs can be set up across a network. Once the connection is established, ATM cells are forwarded by simple table lookups, e.g., using connection tables.

As indicated above, the PNNI specification requires that QoS sensitive source routing algorithms be used in the PNNI hierarchical routing environment. QoS sensitive routing implies that the route selection algorithm must determine whether a source route can support all of the QoS requirements of a request. This requires that the routing algorithm consider both link constraints and path constraints. Link constraints such as available bandwidth (AvCR) are relatively easy to deal with because links that do not meet a caller's requirements may simply be dropped or pruned from the topology during the shortest path calculation. However, path constraints such as cell transfer delay (CTD) and cell delay variation (CDV) are more difficult to deal with because they are not dependent on a single link only and, to date, no known routing algorithm is capable of optimizing for multiple path constraints.

Of the known routing algorithms (or shortest path algorithms), on demand routing has gained some popularity. Indeed, one method of on-demand routing is presented as an appendix to the ATM Forum's PNNI specification. In general, on-demand routing performs a separate route computation for each requested route. On-demand routing according to this method optimizes on a single path constraint while pruning links that do not meet the caller's requirements.

Another routing scheme proposed in the PNNI specification uses pre-computed routes. In this case, sets of paths for each QoS (e.g., constant bit rate (CBR), real-time variable bit rate (rtVBR), non-real-time variable bit rate (nrtVBR), available bit rate (ABR) and unspecified bit rate (UBR)) are pre-calculated by computing the shortest path routes using a single optimization criteria for a single class of service. The routes provided are optimized without considering bandwidth (i.e., so long as a link has >0bandwidth it is used for the shortest path computation) and the method falls back to on-demand routing every time the search of pre-computed routes fails. In general, the pre-computed routes are stored in linear routing tables. Each routing table is maintained as a shortest path tree (SPT), and each SPT is constructed based on the optimization of a single traffic metric. In other words, each SPT maintains a shortest path tree to each reachable destination node in the same PNNI routing domain based on a single criterion, i.e., a traffic metric.

The use of such conventional routing tables, however, has several undesirable effects. For example, because multiple such tables are required to accommodate all of the various traffic metrics and service classes, a considerable amount of memory is required just to store the tables. Indeed, where all service classes exist in a network, a maximum number of these tables may have to be generated and stored. Further, because known routing algorithms can only optimize on a single constraint at a time, this suggests that any SPT made up of traditional routing tables will contain only those paths optimized for the designated traffic parameter. Yet, other parameters (which were not the subject of the route optimization computation) may also be determinative of whether a given route may be used by a connection request. This further increases the demand for sufficient memory to store the necessary routing tables.

What is desired, is a method for creating routing table structures for ATM or other networks that avoids the drawbacks of prior schemes.

SUMMARY OF THE INVENTION

The present invention provides a scheme for using distribution trees for point-to-multipoint connections within ATM or other computer networks.

In one embodiment, a dynamically created distribution tree for point-to-multipoint connections within a computer network may be created according to routing selections for at least one point-to-point connection of the point-to-multipoint connection. The routing selections may be made (e.g., optimized) according to traffic metrics advertised for service classes within the network. The traffic metrics may include administrative weight (AW), cell transfer delay (CTD) and cell delay variation (CDV). The service classes may include constant bit rate (CBR); real-time variable bit rate (rtVBR), non-real-time variable bit rate (nrtVBR); available bit rate (ABR); and unspecified bit rate (UBR). The distribution tree may thus represent routes within the computer network optimized to share the routing selections made for the point-to-point connection.

In a further embodiment, dynamically generating a distribution table for a point-to-multipoint connection supported by an ATM network may be accomplished according to the number of connections shared by individual point-to-point connections that comprise the point-to-multipoint connection. The distribution table may be organized in a format having two dimensions with row indices thereof comprising PNNI node indices of succeeding nodes along a connection DTL. Individual entries in a first column of the distribution table may indicate PNNI node indices of proceeding nodes along the connection DTL. Individual entries in a second column of the distribution table may indicate the number of point-to-point connections for the point-to-multipoint connection that use a link connecting a pair of proceeding and succeeding nodes. A path may be selected from the distribution table in response to a request for a point-to-multipoint connection within the ATM network. Further, the distribution table may be updated in response to a call being added or dropped within the ATM network.

In yet another embodiment, a distribution table that includes a first column having network indices of nodes along a connection path of one or more point-to-point connections of a point-to-multipoint connection within a network; and a second column including values indicating the number of point-to-point connections for the point-to-multipoint connection that use a link connecting a pair of the nodes is provided. The network indices may be PNNI node indices and the network may be an ATM network. In some cases, the first column is indexable using network indices of succeeding nodes along the connection path and for each index of one of the succeeding nodes; an entry in the first column indicates a proceeding node thereof. Also, the connection path may be a path optimized according to the number of shared ones of the point-to-point connections of the point-to-multipoint connection.

In still a further embodiment, a distribution tree that includes a root node representing a source of a call within a network; one or more nodes representing intermediate hops or destinations for the call within the network; and one or more branches representing links that connect the root node to one or more of the nodes or pairs of the nodes is provided. In some cases, a table that is a two-dimensional representation of the distribution tree may be used.

These and other features and advantages provided by the present invention will become apparent from a review of the detailed description and its accompanying drawings that follow.

BRIEF DESCRIPTION OF THE DRAWINGS

The present invention is illustrated by way of example, and not limitation, in the figures of the accompanying drawings in which.

DETAILED DESCRIPTION

Described herein is a scheme for providing routing support for point-to-multipoint connections within a network (e.g., an ATM network) using dynamically creating distribution tree and/or table structures. In general, routing tables provide a selection of pre-computed routes optimized to a specified constraint such as delay and delay variation (e.g., as measured by CTD and CDV), or administrative weight (AW). The routing tables may be implemented as shortest path trees, e.g., as may be generated by a Dijkstra process, which represent the computed routes within the network, optimized to a specified constraint for one or more specified network service categories. Thus, the routing tables allow for rapid compilation of one or more source-computed routes (e.g., DTLs in an ATM network). In some cases, the routing tables may include alternate routes between network nodes. By providing these alternate routes in a single routing table structure, the present invention may utilize less storage and processing resources as compared to routing table schemes of the past. Using the routing tables, a connection DTL for a point-to-point connection of a point-to-multipoint connection may be determined and the routing selections thereof used to create the distribution tree/table. The distribution tree/table may be optimized to provide routes for the remaining connections of the point-to-multipoint connection that share as many of the individual paths or sub-paths of the point-to-point connection as possible or delay any branching therefrom as much as possible.

Figure 1:
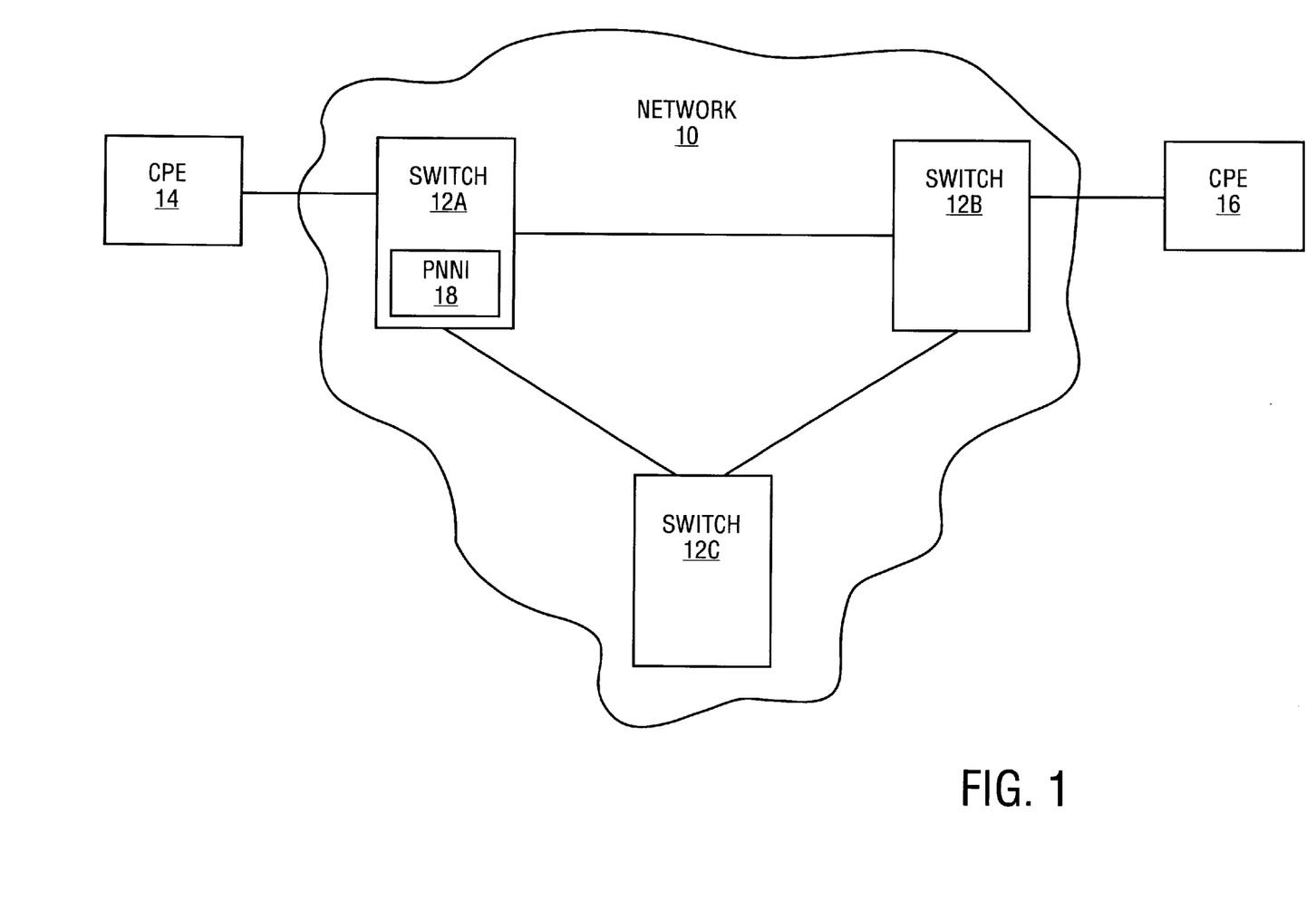
FIG. 1 illustrates an ATM network configured with a routing table structure in accordance with one embodiment of the present invention.

An exemplary call establishment procedure that makes use of point-to-point routing tables created in accordance with the present invention is described with reference to FIG. 1. Network 10 is made up of three switches 12a, 12b and 12c. Of course, this is merely an example and, in practice, a network such as an ATM or other cell or packet switched network will be made up of a number of switches. Assume a user at customer premises equipment (CPE) 14 wishes to establish a connection with CPE 16. For example, a remote user at CPE 14 may wish to access a server at CPE 16. A call setup message from CPE 14 is delivered to switch 12a using a switched virtual circuit (SVC). When the signaling request is received, switch 12a will use PNNI routing agent 18 to determine whether a path through network 10 that meets the call request parameters (e.g., quality of service, bandwidth, etc.) can be established. If no route can be found, then the call is blocked (cleared). If a path is found, a DTL is created for downstream nodes to follow and forwarded along the route.

To determine whether a path exists that will satisfy the call request, the PNNI routing agent 18 uses pre-computed routing tables (called shortest path trees or SPTs) stored in memory at switch 12a to determine whether such a route can be established. The SPTs are pre-computed using a shortest path algorithm, such as a Dijkstra calculation, to determine a path to CPE 16. This calculation will create a set of DTLs, with at least one DTL to each other network switching node that is reachable from switch 12a (i.e., the local switch). Hence, using the pre-computed quality of service sensitive routes, SVCs can be set up across network 10 to connect CPE 14 to CPE 16. Once the connection is established, ATM cells are exchanged between the source and destination.

PNNI routing agent 18 is a relatively independent process within switch 12a and its main function is to create a routing database to be used by a connection manager within switch 12a for SVC connection requests. The routing agent 18 thus provides an interface between the PNNI protocol and the connection manager. As indicated above, when the routing agent 18 is invoked for a route request, it searches pre-calculated routing databases for the given destination along with the requested service class and traffic metric parameters. If a satisfactory route exists, the associated DTL is returned as a response. If for some reason a downstream node rejects the call request (crankback), then the routing agent 18 of the source node provides an alternate route, if any, that does not include the cranked back node(s) and/or link(s).

Figure 2:
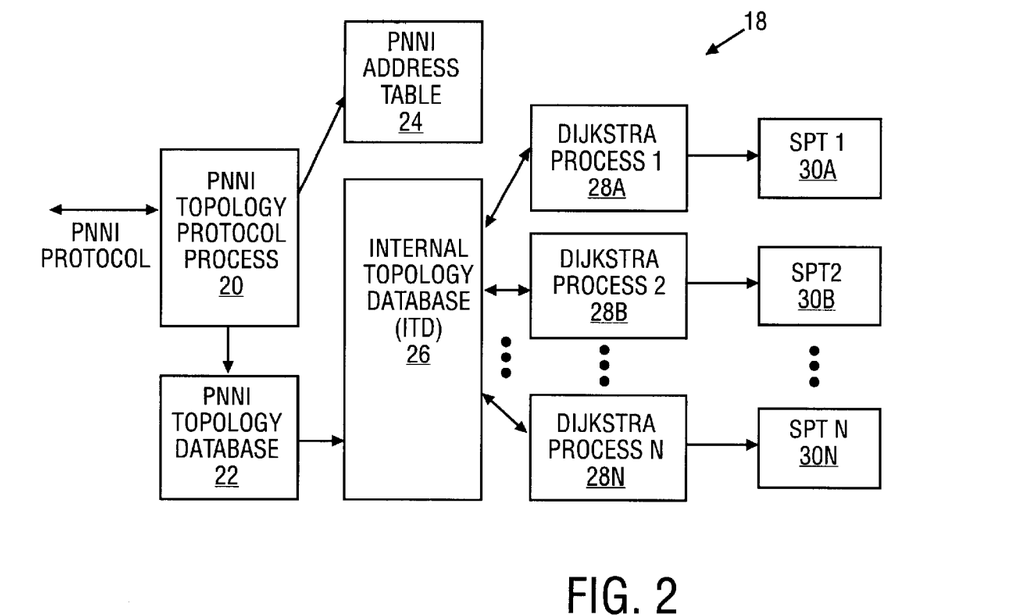
FIG. 2 illustrates a PNNI routing agent configured according to one embodiment of the present invention.

One exemplary embodiment of the PNNI routing agent 18 is shown in more detail in FIG. 2. As a result of the operation of the conventional PNNI topology protocol process 20, a PNNI topology database 22 is created and maintained at switch 12a (e.g., in memory). As indicated above, PNNI uses a reliable flooding mechanism to exchange topology information with other PNNI nodes (e.g., switches) in the same peer group. Thus, a PNNI topology or PTSE (PNNI topology state elements) database is maintained which stores the information received (and to be transmitted) during the flooding process. The PNNI topology database contains the topology information, along with all of the QoS-based traffic parameters that are associated with each link and node of the entire peer group as well as those fed down from higher levels in the network hierarchy. For this embodiment then, each PTSE in the topology database 22 is formatted to resemble a PNNI PTSE to make it more convenient for the flooding procedure.

Also as described above, each PNNI node has a default address. Additional addresses can be obtained via local and network management operations. These addresses are stored in a PNNI address table 24 and may also be used to originate associated PTSEs by the local node (e.g., switch 12a) and flooded to the peer group. The address table 24 thus stores all reachable addresses along with the node(s) via which they can be reached. Addresses so stored are used during a route search as discussed below.

An internal topology database (ITD) 26 is created for use as an input for the various Dijkstra processes 28a–28n. The Dijkstra processes 28a–28n are used to calculate the shortest path routes for the specified network constraints. There is a separate Dijkstra process 28 for each predefined constraint, and each Dijkstra process 28 will generate its own SPT 30. Thus, multiple SPTs 30a–30n are maintained as outputs from the Dijkstra processes 28a–28n, with all SPT 30a–30n optimized on a specified constraint (e.g., a delay- or cost-based constraint). Each SPT 30a–30n describes the shortest path from the local node (e.g., switch 12a) to all other nodes for its respective constraint.

Each Dijkstra process 28a–28n may be executed, and the corresponding SPT 30a–30n regenerated, upon a significant triggering event. Triggering events correspond to changes in the PNNI topology database 22, thus upon such events the associated SPT 30a–30n need to be updated to reflect the change in network topology. Significant triggering events may include topology changes such as the addition or removal of a link or switch or significant link state parameter changes on a link or for a complex node.

When a route request is received, the address table 24 is consulted to see if the destination node's address is present. If the destination node is found, it is noted and located in one or more of the associated SPTs 30a–30n, according to the requested bandwidth and other requirements. An SPT is chosen from among the available options (if more than one exists) and a DTL stack can then be derived. In one embodiment, this is accomplished by traversing the chosen SPT from the destination node to the source node. Such traversal is possible because the SPTs 30a–30n are organized as spanning trees and not as traditional linear tables. This structure is described in further detail in co-pending Application No. 09/069,069, entitled "Routing Table Structures", filed Apr. 28, 1998, by Dean Cheng, assigned to the Assignee of the present application and incorporated herein by reference. Each SPT 30a–30n may maintain multiple equal-cost paths, if any, and a number of equal-cost paths may be considered per SPT. Paths are considered as equal cost if the difference between their accumulated values on a specific constraint is less than or equal to a specified tolerance range.

Notice then that the present routing scheme eschews the use of traditional routing tables. No routing tables are actually generated. Instead, routing tables exist only logically. The route search involves a lookup in the address table 24 first, followed by a read of the pre-calculated SPTs 30a–30n by tracing from destination node to local node. There is a significant amount of time and memory saved (e.g., compared to routing schemes of the past) by not generating traditional routing tables.

Figure 3:
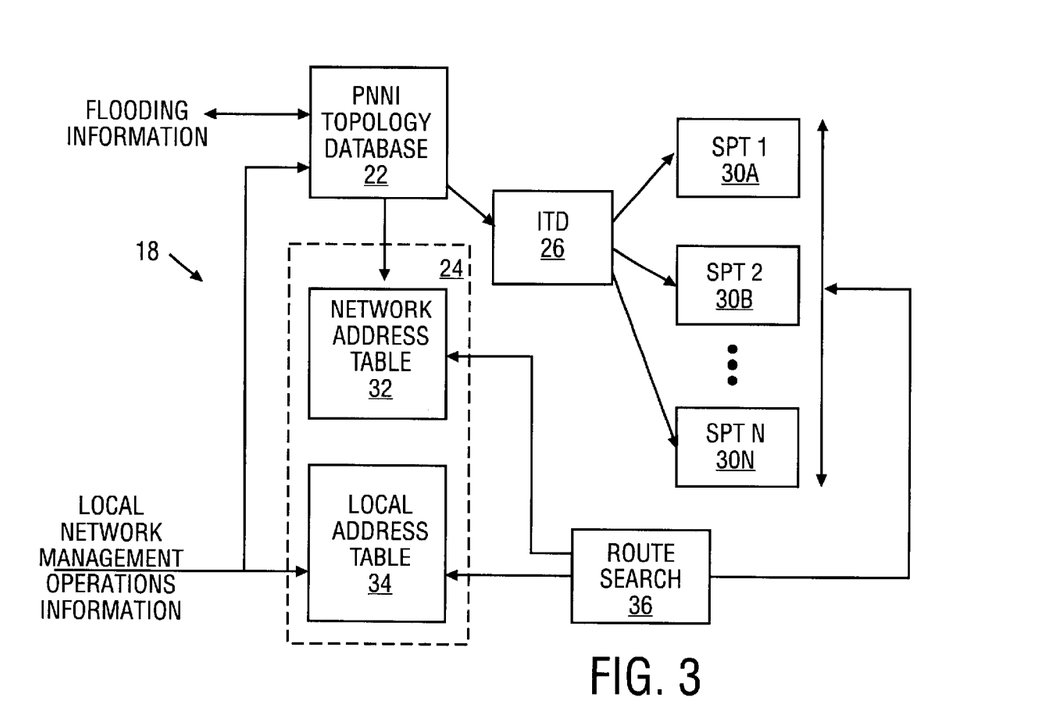
FIG. 3 illustrates a functional diagram for a PNNI routing agent's major data structures and interfaces according to one embodiment of the present invention.

FIG. 3 illustrates a functional diagram for PNNI routing agent 18 according to one embodiment of the present invention. PNNI topology database 22 is shown as being capable of receiving flooding information to allow for the exchange of topology information with other PNNI nodes in the same peer group. The address table 24 may be divided into a network address table 32 and a local address table 34. Locally obtained addresses are stored in the local address table 34 and, as indicated above, may also be used to originate associated PTSEs by the local node and flooded to the peer group. Addresses learned from the network are retrieved from the topology database 22 and stored in the network address table 32 for fast address searching during route searching. The local address table 34 may be used to route a local SVC call, i.e., local switching to a locally attached link or to forward a call from another node. For non-local switching calls, the network address table 32 is searched to find the destination node which advertises the associated address, and, if the destination node is found, one or mode SPTs 30a–30n may be searched using the route search routine 36 to find the path which meets the SVC call requirements to that destination node.

There are three scenarios for a route search. First, if the destination address finds a match in the local address table 34, the SVC call is forwarded to a local port at the source switch. Second, if there is a match in the network address table 34, the PNNI destination node is identified, a search in one or more of the SPTs 30a–30n is performed and, if a route is found, a DTL stack is constructed and the call is forwarded. Third, if no route is found, the call is blocked.

To more fully appreciate the present invention, it is helpful to understand the relationships between various topology metrics and attributes. It is these metrics and attributes which are collected and advertised by the PNNI routing protocol (e.g., during the flooding process referred to above) and which form constraints on links, nodes and paths within a network. Thus, it is these metrics and attributes that form the basis for dynamic routing table generation.

Table A below lists the correlation between service classes and traffic metrics/attributes. Notice that all the metrics/attributes may be specified on the basis of service classes. Where a metric/attribute is designated as "required", this means that the metric/attribute must be specified for the associated service class. "Optional" indicates that the metric/attribute may be specified for the associated service class, and "n/a" indicates that the metric/attribute is not applicable for the associated service class.

TABLE A

| service class metric/attribute | CBR | rtVBR | nrtVBR | ABR | VBR |
| --- | --- | --- | --- | --- | --- |
| AW | required | required | required | required | required |
| maxCR | optional | optional | optional | required | required |
| AvCR | required | required | required | required | n/a |
| maxCTD | required | required | required | n/a | n/a |
| CDV | required | required | n/a | n/a | n/a |
| $CL_0$ | required | required | required | n/a | n/a |
| $CLR_{0+1}$ | required | required | required | n/a | n/a |
| CRM | n/a | optional | optional | n/a | n/a |
| VF | n/a | optional | optional | n/a | n/a |

The traffic metrics/attributes are defined as follows:

Administrative weight (AW) is a value assigned to indicate the relative desirability of using a link or node. It is a dimensionless quantity. AW is additive and can be aggregated during path selection in the Dijkstra calculation. If set to 1 on every link, the accumulated value becomes a hop count. In some embodiments, there may be a single AW configured per interface for all service classes. In other embodiments, AW may be measured for one or more different service classes.

Cell delay variation (CDV) describes the variability in a pattern of cell arrival events observed at a measurement point. More specifically, CDV is the (1a) quantile of the CTD, minus the fixed CTD that could be experienced by any delivered cell on a connection during the entire connection holding time, measured in microseconds. Note that, the ATM Forum defines CTD (cell transfer delay) as a measure of the elapsed time between a cell exit event (i.e., the time at which the first bit of an ATM cell has completed transmission out of an end-system or ATM network element to a public or private ATM network element across a UNI measurement point) at a first measurement point (e.g., a source UNI) and the corresponding cell entry event (i.e., the time at which the last bit of an ATM cell has completed transmission into an end-system or ATM network element from a public or private ATM network element across a UNI measurement point) at a second measurement point (e.g., a destination UNI) for a particular connection. Thus, the CTD between two measurement points is the sum of the total inter-ATM node transmission delay and the total ATM node processing delay between the two measurement points. See, e.g., ATM Forum, *Traffic Management Specification* v4.0 (1996).

CDV is additive and can be accumulated during path selection in the Dijkstra calculation. In some embodiments, CDV may be statically configured on per-trunk basis, e.g., based on queuing delay. In such cases, one CDV value may be used for all supported service classes. In other embodiments, CDV may be a measured value, e.g., using OAM cells. In such cases, CDVs could be measured separately for different service classes, and these different values used in the shortest path computations.

For purposes of the present invention, maxCTD may be regarded as the sum of all fixed delay components across a link or node and CDV, measured in microseconds. The quantity is additive and can be accumulated during the Dijkstra calculation. In one embodiment, maxCTD may be statically configured on s per-trunk basis, e.g., based on distance traversed by a link. In other embodiments, maxCTD may be measured for one or more service classes and the resulting values used for the shortest path computations.

Maximum cell rate (maxCR) may be regarded as the maximum capacity usable by PNNI for SVCs belonging to the specified service category, measured in cells per second. In some embodiments, a single maxCR may be used for all service classes, however, in other embodiments, different values of maxCR may be used for different service classes.

Available cell rate (AvCR) is a measure of effective available capacity for CBR and VBR services and a measure of capacity available for minimum cell rate reservation, measured in cells per sec. A single AvCR may be used for all service classes or, alternatively, separate values may be used for different service classes.

Cell loss ratio ($CLR_0$) is the maximum cell loss ratio for $CLP_0$ traffic (i.e., cells with a CLP bit set to 0) over a link or node. In some embodiments, this value may be statically configured for all applicable service classes. In other embodiments, separate values may be used for different service classes.

Cell loss ratio ($CLR_{0+1}$) is the maximum cell loss ratio for $CLP_{0+1}$ traffic (i.e., cells with a CLP bit set to 1) over a link or node. In some embodiments, this value may be statically configured for all applicable service classes.

Cell rate margin (CRM) is a measure of the difference between the effective bandwidth allocation and the allocation for sustainable cell rates, in cells per second. Again, this may be a statically configured or a measured value.

Variation factor (VF) is a relative measure of the square of the cell rate margin normalized by the variance of the sum of the cell rates of all existing connections. In some embodiments, this value may be statically configured for all applicable service classes. In other embodiments, it may be measured for different service classes.

To summarize, the traffic metrics (AW, CDV and CTD) are additive and may be used for shortest path computations in a Dijkstra calculation when a QoS-based routing path, i.e., one which is optimized on a given traffic metric for a given class of service, is computed. The traffic attributes (maxCR, AvCR, $CLR_0$, $CLR_{0+1}$, VF and CRM) are not additive and, therefor, are not used as optimization criteria for the Dijkstra calculations. In the present invention then, a routing table is a combined set of DTLs, where each DTL describes an optimal routing path from the calculating node (i.e., the node where the table is computed) to a given destination node. More particularly, the present invention makes use of two strategies for route calculation (i.e., for creation of the SPTs $30a$–$30n$): cost-based or delay-based. If cost-based routing is used, the SPT's constraint is AW, if delay-based routing is used, the SPT's constraint is CTD or CDV.

For the illustrated embodiment then, the Dijkstra algorithm is used to pre-calculate routes from the local node to each reachable destination node. The number of pre-calculated routing tables depends on the number of combinations of service class-based PTSEs that a node generates and receives from the network as part of the flooding process. For example, the minimum number of routing tables that would be generated is three, where each of the traffic parameters is identical for all applicable classes of service with the associated link or node in the routing domain. In one embodiment, this is a default condition and the three tables generated are: (a) one table optimized on AW for all service classes, (b) one table optimized on CTD for CBR, rtVBR and nrtVBR service classes, and (c) one table optimized on CDV for CBR and rtVBR service classes.

When the calculating node (i.e., the node that is generating the routing tables) generates or receives service class-based traffic metrics the previously computed tables split accordingly and new routing tables are generated. This may occur up to the generation of any number from 3 to 10, inclusively, of routing tables where 10 is the maximum number as follows:

1. a table optimized on AW for CBR;
2. a table optimized on AW for rtVBR;
3. a table optimized on AW for nrtVBR;
4. a table optimized on AW for UBR;
5. a table optimized on AW for ABR;
6. a table optimized on CTD for CBR;
7. a table optimized on CTD for rtVBR;
8. a table optimized on CTD for nrtVBR;
9. a table optimized on CDV for CBR; and
10. a table optimized on CDV for rtVBR.

Note the correspondence between the required routing tables and the required traffic metrics per service class as shown in Table A. Of course, any number of tables between the default value of 3 and the maximum number of 10 may be generated according to the service classed-based traffic metrics which are being advertised by the local node and the network (e.g., if AW is common for all service classes, but the other traffic metrics are not, then only a single table optimized on AW is required in addition to two tables optimized on CDV and three tables optimized on CTD, etc.). By only generating the number of tables actually required to support the current network configuration (i.e., the current traffic metrics associated with the available service classes), the present scheme may significantly reduce the requirement for memory storage space, as well as the CPU processing resources, space for the tables as compared to routing table schemes of the past.

In each case, each SPT $30a$–$30n$ may be created using a single Dijkstra process 28 optimized to the specified constraint (i.e., traffic metric). Alternatively, a set of Dijkstra processes $28a$–$28n$ may be used to create SPTs $30a$–$30n$ for each specified constraint. The input for the Dijkstra processes $28a$–$28n$ is the PNNI topology database, which, in order to benefit execution speed, may be reformatted to a separate memory space as ITD 26. The individual constraints used by each Dijkstra process 28a–28n are configurable parameters.

In one embodiment, the output of each Dijkstra calculation is an SPT with its root at the local node and branches spanning outward towards all other nodes. Each SPT may accommodate multiple paths to the same destination. A configurable tolerance value for the accumulated cost is used by the Dijkstra calculation. Paths are considered equal-cost if the difference between their accumulated values is within the tolerance. All (or some) equal-cost paths are maintained in a single SPT. The equal-cost tolerance is configurable on a per node basis. The setting of this value will control the number of alternate routes contained in each SPT 30a–30n. A small value will result in fewer alternate routes than a large value. In this way, a network administrator can trade off setup time and SPT size with the ability to balance loads across paths with similar QoS characteristics.

As indicated above, within an SPT, a selection of alternate equal-cost paths may be provided. This makes it possible to share loads between paths with equal cost. When an SPT provides multiple equal-cost paths as determined by the equal-cost tolerance parameter, a path may be chosen from the selection at random. A random choice is used because, in the absence of valid link state information, which is the case when many connections are being routed over the same path in a short time, a random choice has been found to distribute the load better than a choice based on stale link state information. Of course, other equal-cost path selection processes could be used.

The use of pre-computed routing tables tends to speed up (e.g., over on-demand routing schemes) the call processing at the calculating node (i.e., the node operating on switch 12a). As indicated, each table contains a set of DTLs that lead to all the other nodes of the network. The routing paths contained in a given routing table are optimized on a single additive traffic metric and for a given service category. Note, sometimes a single table contains paths which are optimized for multiple service categories, for example where all the traffic parameters are the same for the associated service categories. In such cases, the number of required routing tables could be reduced.

Thus, the routing path selection for the point-to-point connections is accomplished on a call-by-call basis, where a path is selected to meet the requirement contained in the call request itself. For point-to-multipoint connections, an additional requirement is the optimization on the usage of virtual circuits. A point-to-multipoint call, for a given call reference number at the originating node, can be viewed as a collection of point-to-point calls. After the first connection route is established (e.g., using the route selection methodology described above), a routing optimization scheme may be used for the remainder of the connections in order to merge the routing paths of the different connections as much as possible, or using as little branching as possible.

The multipoint optimization scheme involves the dynamic creation of a distribution tree for each group of the point-to-multipoint connections. A distribution tree has a single root node, i.e., the PNNI source node which generates the DTL for each call request, and it branches out and traverses one or more hops via intermediate nodes (e.g., switches) to reach a group of leaf nodes as destinations. A branch (representing a link that connects a pair of proceeding and succeeding nodes) in the distribution tree may be shared by more than one connection (from the root node to different leaf nodes).

Before any calls are connected, the distribution tree is "empty" (i.e., no branches exist between the nodes). When the first point-to-point connection is established, the associated branches are added to the tree according to the DTLs of that connection. For the subsequent call requests, the distribution tree is consulted in conjunction with the above-described path selection procedure to determine whether any branches (one or more) in the existing tree can be shared for the new connection. When such common or shared branches are located, they should be included in the resulting DTL for the new connection. When a connection is released, the associated branches in the tree are taken out. As a result, the distribution tree represents a collection of active DTL records for connections from the root node to all the leaf nodes. Further details of the optimization scheme are described below.

Figure 4:
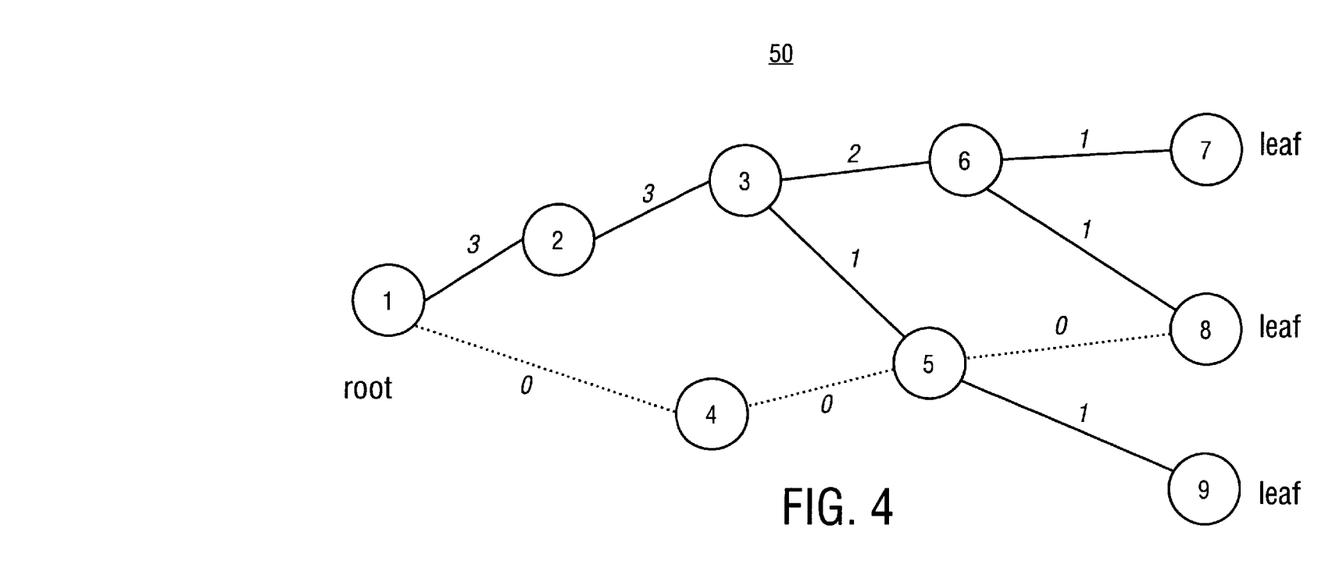
FIG. 4 illustrates a distribution tree representing a collection of DTLs for a point-to-multipoint call in a hypothetical network in accordance with an embodiment of the present invention.

As indicated above, a distribution tree is a collection of DTLs for a given point-to-multipoint connection, with each DTL constructed at the source node, i.e., the root, for a connection to a single leaf node. The branches of the distribution tree, representing links between proceeding and succeeding nodes of DTLs, may be overlapped. FIG. 4 illustrates a point-to-multipoint distribution tree 50 with the root at the node 1 and three leaf nodes 7, 8 and 9. The three DTLs constructed at node 1 are:

$DTL_1$ for leaf node 7 is 1 →2 →3 →6 →7

$DTL_2$ for leaf node 8 is 1 →2 →3 →6 →8

$DTL_3$ for leaf node 9 is 1 →2 →3 →5 →9

The fact that some of the branches of distribution tree 50 are shared by multiple point-to-point connections is implied by the tree topology itself. For example, the branch which represents the link between the proceeding node 1 and succeeding node 2 are shared by all three point-to-point connections, as indicated by the number 3 in FIG. 4. Branches designated by a 0 are not part of the distribution tree. They are included here to illustrate alternate routing paths for some of the point-to-point connections. Note also for a given DTL for a point-to-point connection, it is not necessarily the most optimal path, due to the additional optimization constraint which tries to find the common branches among the existing point-to-point connections for the same point-to-multipoint call.

The distribution tree is maintained dynamically, i.e., it is updated each time a connection is either newly established or released for a given point-to-multipoint call and, as a result, branches and/or nodes may be added or deleted from the tree. The root of the distribution tree may be either the originating node or an entry border node of a PNNI peer group for a point-to-multipoint call. Intermediate nodes of a DTL within a PNNI peer group need not maintain the distribution tree. Instead, these nodes need only follow the established DTLs to forward the call as usual.

In order to allow for efficiency in the maintenance and access of the point-to-multipoint distribution tree, a table structure may be defined as a representation of the tree and used to store the relevant information therefrom. For example, a point-to-multipoint distribution tree may be represented by a two-dimensional table of equal size in both dimensions. The index to each axis of the table may then be the PNNI node indices (e.g., from 1 to a maximum number PNNI_max, 9 for the example shown in FIG. 4, with the number 1 representing the originating node). In such a scheme, the row index ($r\_ix$) represents the PNNI node index for the succeeding node on a link of a DTL, and the column index ($c\_ix$) represents the PNNI node index for the proceeding node on the same link. Then, the entry at ($r\_ix$, $c\_ix$) indicates the number of point-to-point connections for a given point-to-multipoint call that use this link. A zero entry indicates the associated link is not on the tree (i.e., is not used by any call).

For example, suppose the point-to-multipoint distribution tree 50 in FIG. 4 resulted from the calls of the following sequence:

(a) a call from the root (node 1) to leaf node 7 is established, (b) a call from the root (node 1) to leaf node 8 is established, and (c) a call from the root (node 1) to leaf node 9 is established.

Figure 5:
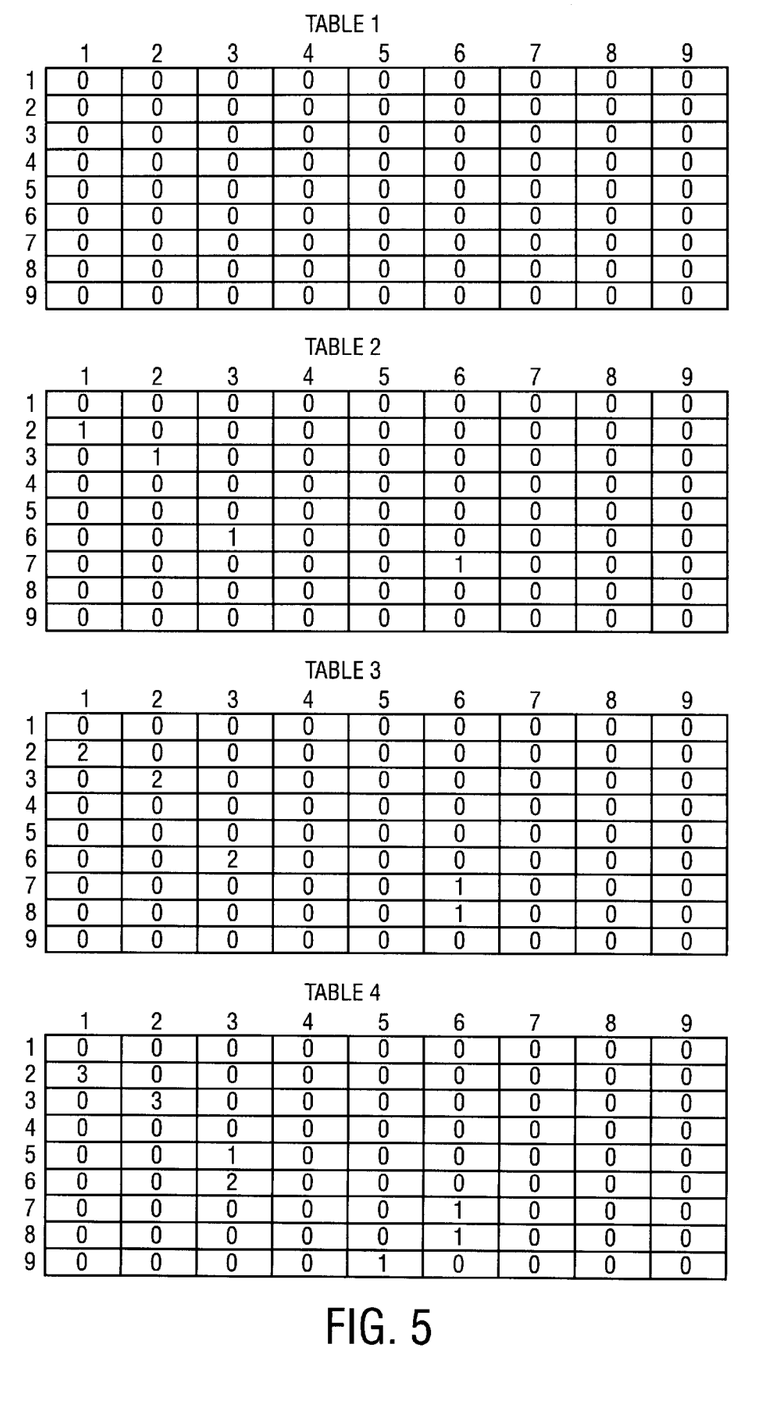
FIG. 5 illustrates distribution tables created at various stages in call routing through the network illustrated in FIG. 4.

The point-to-multipoint distribution tables before (a), after (a), after (b) and after (c) are as shown in FIG. 5 as Tables 1, 2, 3 and 4, respectively. Notice Table 1 is empty (all zero entries), indicating no calls were active. The call represented by (a) results in the distribution table scheme of Table 2, where links between nodes 1 and 2, 2 and 3, 3 and 6, and 6 and 7 were established. Call (b) utilized the existing links between nodes 1 and 2, 2 and 3, and 3 and 6 (as indicated by the link count being updated to 2 for each of these links), and added a new link between nodes 6 and 8. Finally, call (c) utilized the existing links between nodes 1 and 2, and 2 and 3 (thus resulting in the link counts being updated to 3), and added new links between nodes 3 and 5, and 5 and 9.

Now suppose changes to the distribution tree are caused by:

(d) the connection from the root (node 1) to leaf node 9 is released.

Figure 6A:
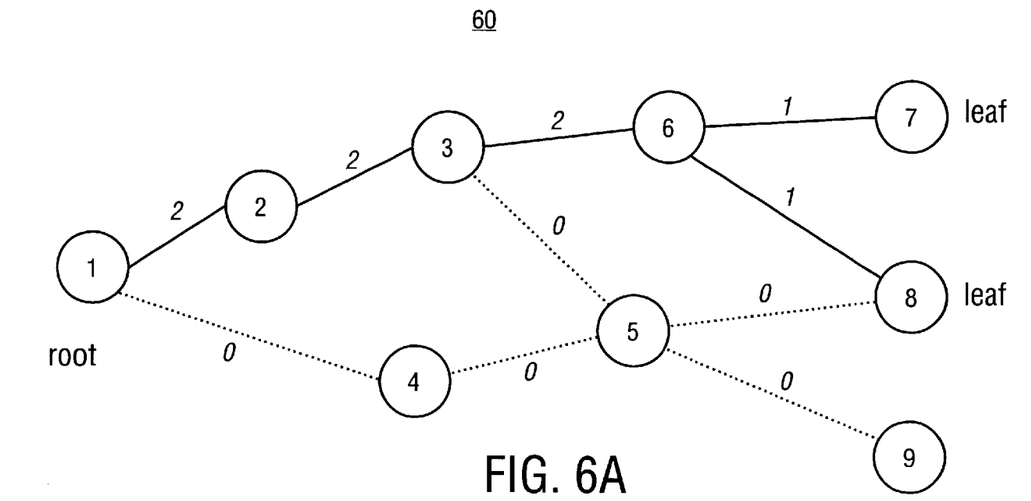
FIG. 6A illustrates a distribution tree for the point-to-multipoint call in the network of FIG. 4 after various call processing changes.
Figure 6B:
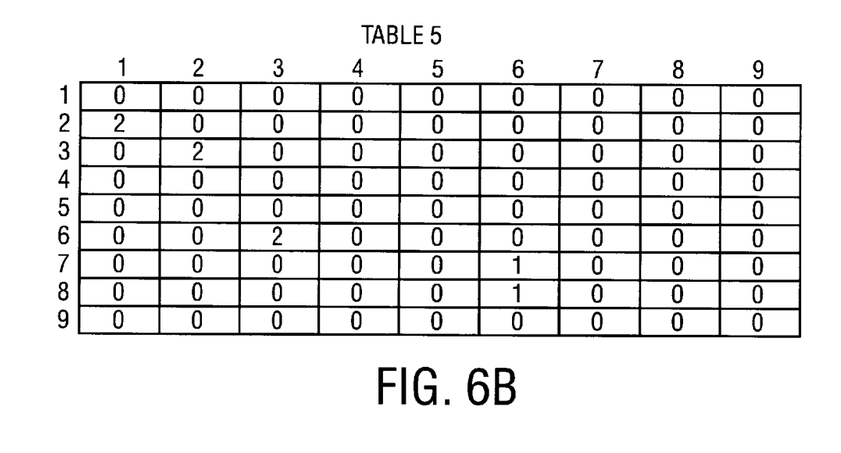
FIG. 6B illustrates the distribution table corresponding to the distribution tree shown in FIG. 6A.

The resulting point-to-multipoint distribution tree 60 and its table representation are shown in FIG. 6A and Table 5 of FIG. 6B, respectively.

Further changes may be:

(e) a call from the root (node 1) to leaf node 5 is established.

Figure 7A:
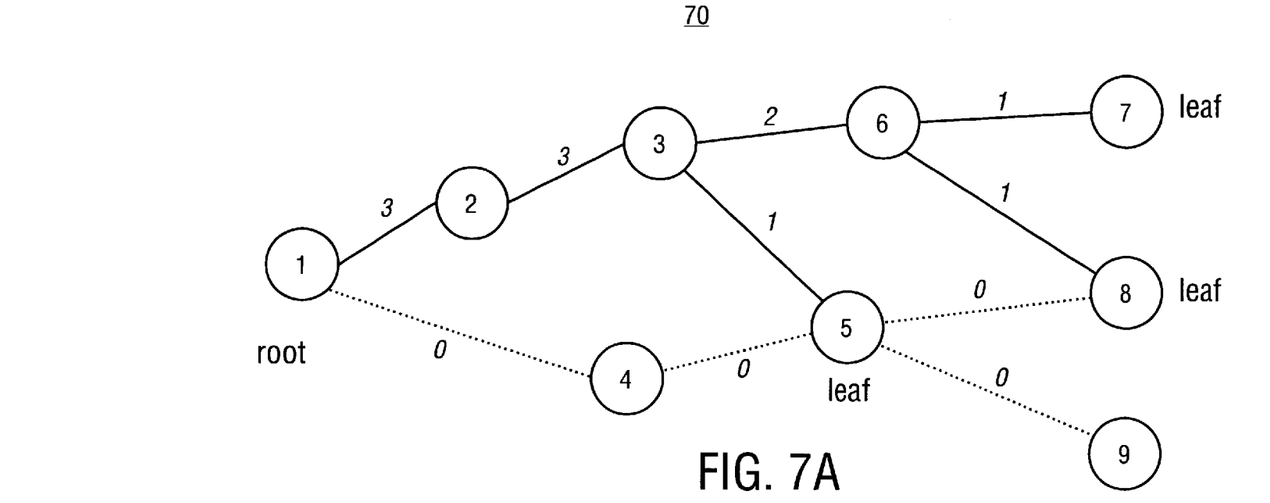
FIG. 7A illustrates a distribution tree for the point-to-multipoint call in the network of FIG. 4 after further call processing changes.
Figure 7B:
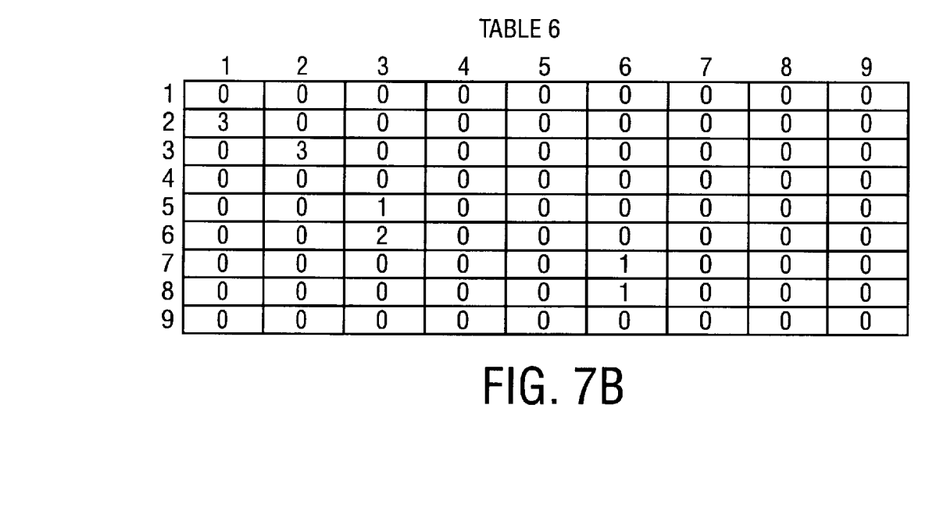
FIG. 7B illustrates the distribution table corresponding to the distribution tree shown in FIG. 7A.

The resulting point-to-multipoint distribution tree 70 and its table representation are shown in FIG. 7A and Table 6 of FIG. 7B, respectively. Further changes to the calls may be similarly represented by other trees and table representations thereof.

Noting that the distribution tree is a spanning tree where there is at most one proceeding node for each succeeding node, a more compact table representation for the point-to-multipoint distribution tree can be used. Such a compact representation may allow for savings in the amount of memory space required to store the table and may also allow for efficiencies in table look-up procedures.

The compact table still has two dimensions, but includes only two columns (1 and 2). As before, the row index is the PNNI node index (of the succeeding node). Thus, the entry (r_ix, 1) indicates the PNNI node index of the proceeding node. The entry (r_ix, 2) indicates the number of point-to-point connections for a given point-to-multipoint call that use this link. This number is updated each time a point-to-point connection associated with a given point-to-multipoint call is either established or released. When this number becomes as zero (i.e., when no point-to-point calls share the link), the value in column one (1) for the same row is set to zero, indicating there is no proceeding node (i.e., given r_ix is the node index of the succeeding node, a zero entry for (r_ix, 1) indicates that no proceeding node exists).

Figure 8:
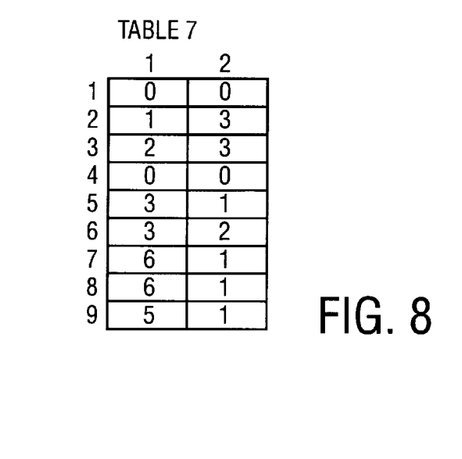
FIG. 8 illustrates a reduced complexity distribution table for the pint-to-multipoint distribution tree of FIG. 4 in accordance with a further embodiment of the present invention.

Table 7 of FIG. 8 is a compact table representation for Table 4 of FIG. 5. Notice that a DTL can be traced by starting at a leaf node (e.g., node 9) and working backwards to the root using the entries in column one (1) (e.g., 9 →5 →3 →2 →1). The column two (2) entries indicate that only one call uses the link between nodes 9 and 5, but all three calls (from the earlier example which produced Table 4) use nodes 3 and 2 as transit or intermediate nodes. Thus, the compact representation table provides all of the same information as the full table structure, with a dramatic reduction in the amount of memory space required to store the information (18 entries versus 81 entries for the non-compact table representation, a reduction of nearly 80% in the number of entries). In addition, the compact table structure lends itself to efficient search techniques, which merely need to trace backwards from the leaf node to the root to determine the DTL.

Path selection for a point-to-point connection for a given point-to-multipoint call follows the regular point-to-point call path selection described above, with the additional multipoint considerations as follows. During the route search, reference is made to the associated multipoint distribution tree (e.g., its associated table). For each node on a potential DTL, the table is consulted. The node index of the node on the DTL is used as the row index (r_ix) to access the table and a check is made to determine whether any proceeding node for this succeeding node exists. If so, the partial path from the common proceeding node back to the source node should be used as the rest of the DTL which is in construction.

As discussed above, for a regular point-to-point call the route search is performed by traversing the shortest path trees (as routing tables) in a backwards direction, i.e., from the destination node towards the source node. This strategy should be applied to the point-to-multipoint call as well. Note that at each intermediate node of any DTL candidate, if there is more than one link that leads to different parent nodes (proceeding nodes), they should be all examined, according to the scheme outline above. Because of the backwards path searching, the earlier a common proceeding node can be found, if any, the better, in the sense that it will delay the branching for the new connection until such branching is truly necessary.

On-demand route searches may be invoked for point-to-multipoint connections in the same way as for point-to-point calls. For the same optimization reasons described above, the on-demand search should proceed from the leaf node towards the root node and should be performed in a breadth-first manner The point-to-multipoint distribution trees and/or the associated tables may be maintained in memory in the same fashion as the point-to-point connection tables discussed above. At least one table per point-to-multipoint connection at the call-originating node or an associated entry border node for a PNNI peer group should be maintained. The PNNI routing agent (e.g., routing agent 18) that performs the route search may be given direct access to the point-to-multipoint distribution trees/tables using the PNNI node indices as described above.

Thus, routing support for point-to-multipoint connections has been described. Although discussed with reference to specific illustrated embodiments, the generality of present invention should not be limited thereby. Instead, the present invention should only be measured in terms of the claims, which follow.

What is claimed is:

1. A method comprising:

receiving information about routing selections; and dynamically creating a distribution tree representing a point-to-multipoint connection within a computer network according to routing selections made for at least one point-to-point connection of the point-to-multipoint connection.

2. The method of claim 1 wherein the routing selections for the at least one point-to-point connection are made according to traffic metrics advertised for service classes within the network.

3. The method of claim 2 wherein the traffic metrics include administrative weight (AW), cell transfer delay (CTD) and cell delay variation (CDV).

4. The method of claim 3 wherein the service classes include constant bit rate (CBR), real-time variable bit rate (rtVBR), non-real-time variable bit rate (nrtVBR), available bit rate (ABR) and unspecified bit rate (UBR).

5. The method of claim 2 wherein the routing selections provide pre-computed routes within the computer network optimized to one of the traffic metrics.

6. The method of claim 5 wherein the distribution tree represents routes within the computer network optimized to share one or more of the routing selections of the at least one point-to-point connection.

7. The method of claim 1 wherein the distribution tree is represented as a multidimensional table stored in a computer-readable format.

8. A method comprising:

receiving information about a number of connections; and dynamically generating a distribution table representing a point-to-multipoint connection supported by an ATM network according to the number of connections shared by individual point-to-point connections which comprise the point-to-multipoint connection.

9. The method of claim 8 wherein the distribution table is organized in a format having two dimensions with row indices thereof comprising PNNI node indices of succeeding nodes along a connection DTL.

10. The method of claim 9 wherein individual entries in a first column of the distribution table indicate PNNI node indices of proceeding nodes along the connection DTL.

11. The method of claim 10 wherein individual entries in a second column of the distribution table indicate the number of point-to-point connections for the point-to-multipoint connection that use a link connecting a pair of proceeding and succeeding nodes.

12. The method of claim 8 further comprising selecting a path from the distribution table in response to a request for a point-to-multipoint connection within the ATM network.

13. The method of claim 8 further comprising updating the distribution table in response to a call being added or dropped within the ATM network.

14. A distribution table, comprising:

a first column including network indices of nodes along a connection path of one or more point-to-point connections of a point-to-multipoint connection within a network; and a second column including values indicating the number of point-to-point connections for the point-to-multipoint connection that use a link connecting a pair of the nodes.

15. The distribution table of claim 14 wherein the network indices comprise PNNI node indices.

16. The distribution table of claim 15 wherein the network comprises an ATM network.

17. The distribution table of claim 14 wherein the first column is indexable using network indices of succeeding nodes along the connection path and for each index of one of the succeeding nodes, an entry in the first column indicates a proceeding node thereof.

18. The distribution table of claim 14 wherein the connection path comprises a path optimized according to the number of shared ones of the point-to-point connections of the point-to-multipoint connection.

19. An apparatus comprising:

means for receiving routing information about routing selections; and means for dynamically creating a distribution tree representing a point-to-multipoint connection within a computer network according to routing selections made for at least one point-to-point connection of the point-to-multipoint connection.

20. The apparatus of claim 19 wherein the routing selections for the at least one point-to-point connection are made according to traffic metrics advertised for service classes within the network.

21. The apparatus of claim 20 wherein the traffic metrics include administrative weight (AW), cell transfer delay (CTD) and cell delay variation (CDV).

22. The apparatus of claim 21 wherein the service classes include constant bit rate (CBR), real-time variable bit rate (rtVBR), non-real-time variable bit rate (nrtVBR), available bit rate (ABR) and unspecified bit rate (UBR).

23. The apparatus of claim 20 wherein the routing selections provide pre-computed routes within the computer network optimized to one of the traffic metrics.

24. The apparatus of claim 23 wherein the distribution tree represents routes within the computer network optimized to share one or more of the routing selections of the at least one point-to-point connection.

25. The apparatus of claim 19 wherein the distribution tree is represented as a multidimensional table stored in a computer-readable format.

26. An apparatus comprising:

receiving information about a number of connections; and means for dynamically generating a distribution table representing a point-to-multipoint connection supported by an ATM network according to the number of connections shared by individual point-to-point connections which comprise the point-to-multipoint connection.

27. The apparatus of claim 26 wherein the distribution table is organized in a format having two dimensions with row indices thereof comprising PNNI node indices of succeeding nodes along a connection DTL.

28. The apparatus of claim 27 wherein individual entries in a first column of the distribution table indicate PNNI node indices of proceeding nodes along the connection DTL.

29. The apparatus of claim 28 wherein individual entries in a second column of the distribution table indicate the number of point-to-point connections for the point-to-multipoint connection that use a link connecting a pair of proceeding and succeeding nodes.

30. The apparatus of claim 26 further comprising means for selecting a path from the distribution table in response to a request for a point-to-multipoint connection within the ATM network.

31. The apparatus of claim 8 further comprising means for updating the distribution table in response to a call being added or dropped within the ATM network.

* * * * *